United States Patent
Wolford

[19]

[11] Patent Number: 6,149,527
[45] Date of Patent: *Nov. 21, 2000

[54] APPARATUS FOR IMPARTING ROTARY MOTION THROUGH A FLEX POINT

[76] Inventor: Thomas A. Wolford, 432 W. Umpqua, Roseburg, Oreg. 97470

[*] Notice: Under 35 U.S.C. 154(b), the term of this patent shall be extended for 571 days.

[21] Appl. No.: 08/888,005

[22] Filed: Jul. 3, 1997

Related U.S. Application Data

[63] Continuation of application No. 08/399,818, Mar. 6, 1995, abandoned, which is a continuation-in-part of application No. 08/164,634, Dec. 8, 1993, Pat. No. 5,395,077, which is a continuation of application No. 07/732,930, Jul. 19, 1991, abandoned.

[51] Int. Cl.$^7$ ........................................ F16D 3/00
[52] U.S. Cl. ......................... 464/136; 464/905; 464/906
[58] Field of Search ................................. 464/905, 906, 464/134, 136, 112, 182; 244/234, 237; 74/471 R, 471 XY, 479, 489, 488, 496; 273/148 B

[56] References Cited

U.S. PATENT DOCUMENTS

| | | | |
|---|---|---|---|
| 1,314,600 | 9/1919 | McCaskey | 464/147 |
| 2,396,309 | 3/1946 | Wodal | 244/234 |
| 2,398,601 | 4/1946 | Seifert | 244/237 |
| 2,440,225 | 4/1948 | Pullin | 416/102 |
| 2,615,317 | 10/1952 | Rzeppa | 464/906 |
| 3,011,739 | 12/1961 | Boyce et al. | 244/83 |
| 3,350,956 | 11/1967 | Monge | 74/471 |
| 3,409,252 | 11/1968 | Miller | 244/237 |
| 3,543,599 | 12/1970 | Caswell | 244/234 |
| 3,584,918 | 6/1971 | Gaglione | 464/147 |
| 3,771,037 | 11/1973 | Bailey, Jr. | 318/580 |
| 3,820,641 | 6/1974 | Borst et al. | 192/98 |
| 4,012,014 | 3/1977 | Marshall | 244/83 F |
| 4,062,508 | 12/1977 | Stephens et al. | 244/234 |
| 4,124,999 | 11/1978 | Hirasawatsu et al. | 464/182 X |
| 4,127,245 | 11/1978 | Tefft et al. | 244/234 |
| 4,134,560 | 1/1979 | Messerschmidt | 244/234 |
| 4,263,788 | 4/1981 | Beimgraben | 464/147 |
| 4,300,362 | 11/1981 | Lande et al. | 464/147 |
| 4,333,319 | 6/1982 | Bischoff | 464/134 X |
| 4,348,874 | 9/1982 | Müller et al. | 464/182 X |
| 4,365,488 | 12/1982 | Mochida et al. | 464/134 X |
| 4,431,334 | 2/1984 | Cleveland et al. | 464/134 X |
| 4,579,546 | 4/1986 | Pastor | 464/136 X |
| 4,667,909 | 5/1987 | Curci | 244/234 |
| 4,696,659 | 9/1987 | Molaug | 464/179 X |
| 4,795,952 | 1/1989 | Brandstetter | 318/560 |
| 4,819,896 | 4/1989 | Narad | 244/234 |
| 4,834,692 | 5/1989 | Lindenthal et al. | 464/136 |
| 4,865,277 | 9/1989 | Smith et al. | 244/234 |
| 4,947,701 | 8/1990 | Hegg | 244/237 |
| 5,368,523 | 11/1994 | Mazziotti | 464/906 |
| 5,451,185 | 9/1995 | Krude et al. | 464/906 |

FOREIGN PATENT DOCUMENTS

| | | | |
|---|---|---|---|
| 1177883 | 4/1959 | France | 464/147 |
| 2632770 | 12/1989 | France | 244/237 |

OTHER PUBLICATIONS

New Technology, *Rotor & Wing International* article, Aug. 1992, pp. 38 and 40.

Prouty, The Sidearm Controller: A Few Considerations, *Rotor & Wing International*, Sep. 1992, p. 68.

*Primary Examiner*—Lynne H. Browne
*Assistant Examiner*—Greg Binda
*Attorney, Agent, or Firm*—Dellett and Walters

[57] ABSTRACT

An apparatus for imparting rotary motion through a joint includes a pivotal portion which may freely pivot in two planes relative to a second portion. A rotatable shaft extends through the pivotal portion attaching to a constant velocity joint for translating rotational movement of the shaft into rotational movement of a second shaft. The pivotal portion is mounted to the second portion via a universal joint, with the constant velocity joint placed at the center of the universal joint, achieving high torque rotation.

7 Claims, 3 Drawing Sheets

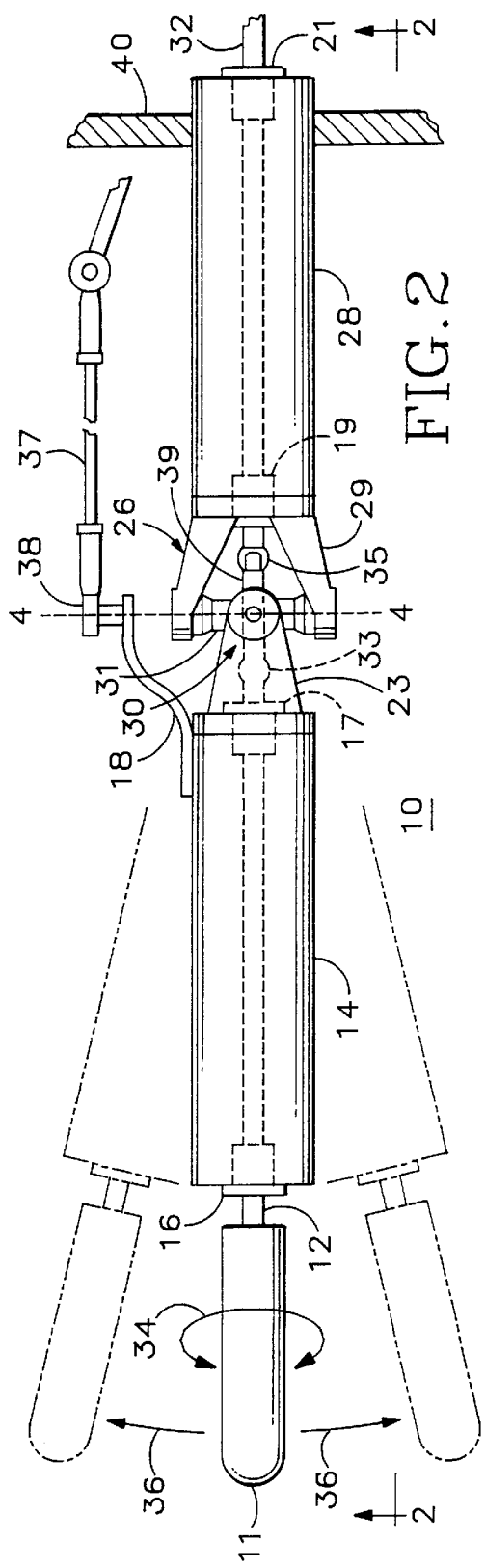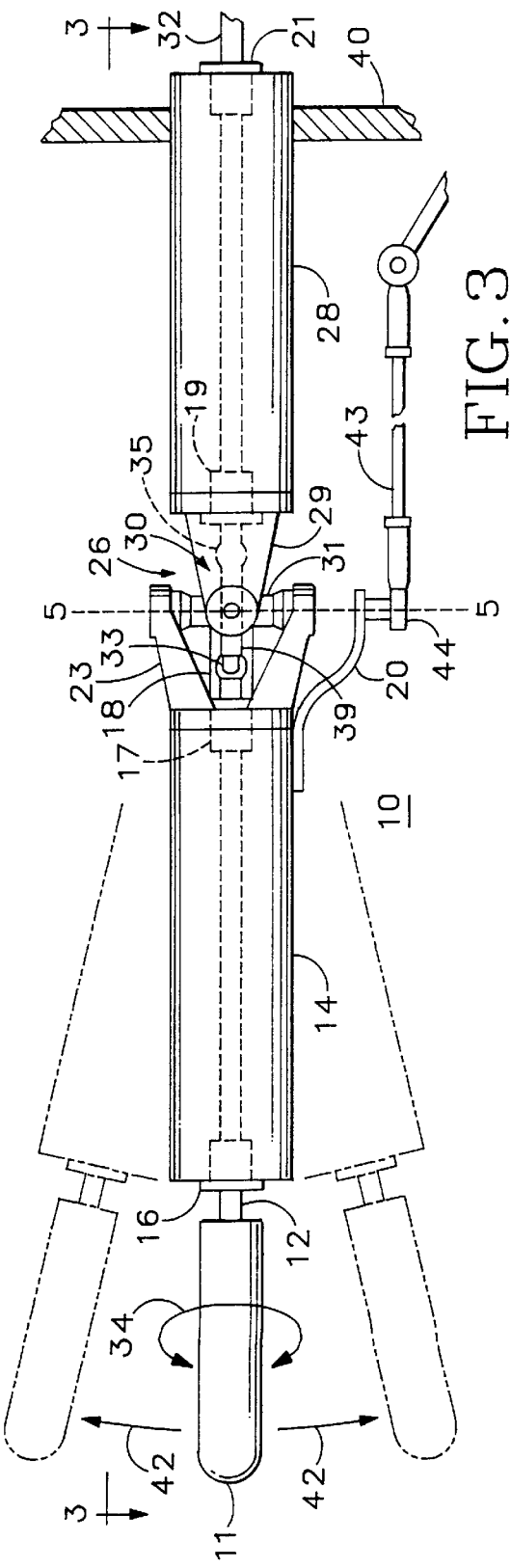

APPARATUS FOR IMPARTING ROTARY MOTION THROUGH A FLEX POINT

This is a continuation of U.S. patent application Ser. No. 08/399,818 filed on Mar. 6, 1995, now abandoned, which is a continuation-in-part of U.S. patent application Ser. No. 08/164,634 filed on Dec. 8, 1993, now U.S. Pat. 5,395,077, which is a continuation of U.S. patent application Ser. No. 07/732,930 filed Jul. 19, 1991, now abandoned.

This invention relates to aircraft controls and more particularly to a method and apparatus for operating a helicopter.

BACKGROUND OF THE INVENTION

Standard helicopter controls require a pilot to coordinate vision with hand and foot movements in order to successfully fly the aircraft. The standard controls include a cyclic stick, a collective pitch stick and rudder foot pedals. The cyclic stick, operated by a pilot's right hand, serves to change the tilt of the helicopter's main rotor disk to direct forward, backward and sideward movement. The collective pitch stick, operated by the pilot's left hand, alters the pitch on the main rotor blades for governing ascent and descent of the helicopter. The collective stick also includes a rotary type throttle for adjusting engine speed. A third set of controls includes the anti-torque (or rudder) comprising a pair of foot pedals manipulated by the pilot's feet. These foot pedals direct the heading of the helicopter by varying the pitch of the tail rotor blades, thereby varying the horizontal thrust produced by the tail rotor. In order to successfully fly a helicopter, the pilot must simultaneously manage the throttle, collective pitch, cyclic pitch and anti-torque, employing the right and left arms and both feet, thus requiring a high degree of eye-to-hand and eye-to-foot coordination.

For example, as the collective pitch is increased (accomplished by raising the collective control with the left arm) additional throttle is required (via rotation of the pilot's left hand) in order to maintain engine speed. Increasing engine power then makes it necessary to change the rudder via movement of the left and right foot pedals in order to compensate for increased torque created by the engine. Throughout the adjustment of the above mentioned controls, the pilot's right hand is kept busy operating the helicopter's cyclic control stick.

SUMMARY OF THE INVENTION

According to one aspect of the invention, a multi-axial hand-operated aircraft control for a helicopter comprises an arm, freely movable in two planes, for adjusting helicopter collective and anti-torque with a single device. The arm includes a throttle for adjusting engine speed. A universal joint and constant velocity joint are employed for allowing easy movement of the arm throughout two planes while allowing operation of the throttle without binding.

A method of flying a helicopter in accordance with the present invention comprises the steps of adjusting the helicopter collective via movement of an arm in one plane while varying helicopter anti-torque via movement of the arm in a second plane orthogonal to the first plane. The method also includes altering the throttle via a control mounted on said arm.

It is accordingly an object of the present invention to provide an improved control for operating a helicopter.

It is another object of the present invention to provide an improved control method and apparatus for a helicopter which does not require use of the pilot's feet for operating the helicopter.

It is another object of the present invention to provide an improved method for flying a helicopter.

It is another object of the present invention to provide an improved throttle control which may be operated without binding irrespective of the position of the throttle and control arm.

It is a further object of the present invention to provide an improved flexible joint which will impart rotary motion while allowing a high degree of flexibility in high torque applications.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is a side view of the multi-axial hand-operated aircraft control of FIG. 1 taken along line 2—2; and FIG. 3 is a side view of the multi-axial hand-operated aircraft control of FIG. 1 taken along line 3—3.

DETAILED DESCRIPTION

Figure 1:
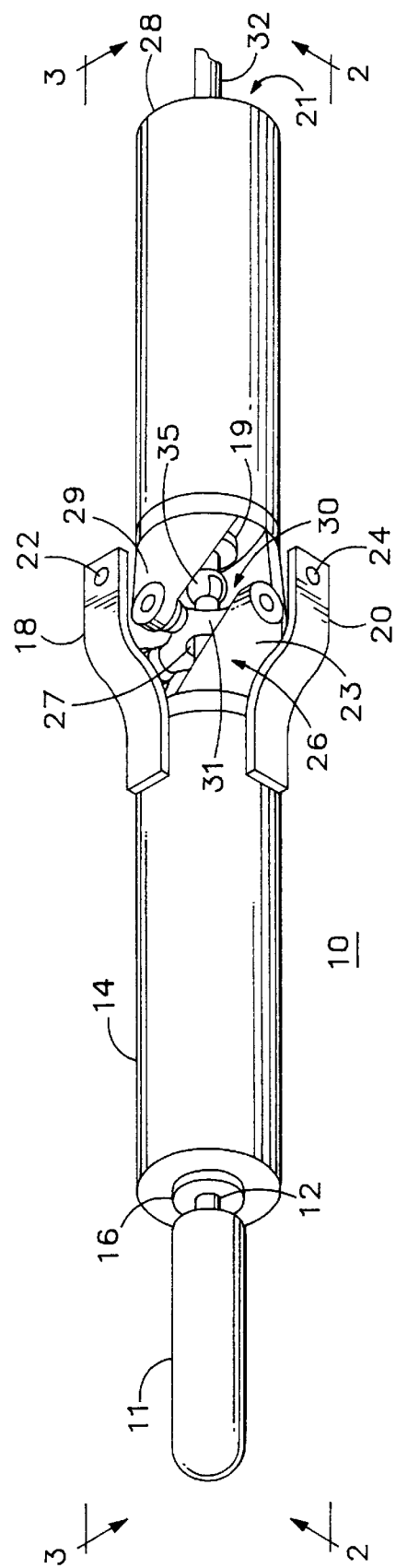
FIG. 1 is a perspective view of a multi-axial hand-operated aircraft control according to the present invention.

Referring to FIG. 1, a perspective view of a multi-axial hand-operated aircraft control 10 in accordance with the present invention, throttle control handle 11 is mounted to throttle shaft 12 which passes through control arm 14 wherein the shaft is held in position via bearings 16 for allowing rotation of the throttle handle and shaft to occur in response to rotational movement of a pilot's hand. The control is positioned within the helicopter such that the arm 14 is substantially horizontal with respect to the fuselage and accessible to the pilot's left hand, with throttle handle 11 oriented in the general direction of the front of the aircraft. Mounted at the base of arm 14, the end opposite throttle control handle 11, are collective control mount member 18 and rudder control mount member 20. Mount members 18 and 20 extend longitudinally away from arm 14 and are placed orthogonally relative to one another. The mount members 18 and 20 bend outwardly away from arm 14 for a short distance and then back in parallel relation with arm 14.

Collective control mount 18 is provided at its lower end with an attachment hole 22 for receiving the helicopter collective control rod 37 (FIG. 2), while rudder control mount 20 similarly includes an attachment hole 24 for engaging the helicopter rudder control rod 43 (FIG. 3). The attachment of the rudder and collective control rods to mounts 18 and 20 (illustrated in FIGS. 2 and 3 herein) is such that movement of control arm 14 in one plane is translated into movement of the helicopter collective control while movement of control arm 14 in another plane translates into motion of the helicopter rudder control.

Also attached at the base of arm 14 is a first coupling half 23 of universal joint 26 wherein an opposing coupling half 29 of universal joint 26 is mounted to base 28. Base 28 is suitably attached to the frame of the helicopter. The universal joint 26 allows arm 14 to move freely in two planes relative to the base. An opening 27 through the center of the central block 31 of universal joint 26 allows a constant velocity joint 30 to be placed therein while permitting the constant velocity joint to rotate. The constant velocity joint, which may be constructed, for example, by joining a coupling half of a first universal joint 33 (not visible in FIG. 1) with a coupling half of a second universal joint 35, is in communication with throttle shaft 12, e.g. by connecting the free coupling half of the first universal joint 33 to the throttle shaft, and also with base throttle shaft 32 (by joining the remaining free coupling half of the second universal joint 35 with the base shaft). The base throttle shaft extends longitudinally through base member 28, rotating on bearings 19 and 21 (suitably attached at opposite ends of the base arm) and then connects to the helicopter throttle control system. The constant velocity joint is freely rotatable within the center of the universal joint 26, and serves to communicate rotational movement of throttle control handle 11 and throttle shaft 12 to helicopter base throttle shaft 32 without binding, irrespective of the position of control arm 14 relative to base member 28.

Referring now to FIG. 2, a view from the rear of the multi-axial hand-operated helicopter control of FIG. 1 taken along line 2—2 in FIG. 1, throttle control shaft 12 is seen to extend longitudinally through base arm 14 and is rotatable as shown by arrow 34. The shaft passes through first and second bearings 17 located at the distal and base ends of the arm for allowing the shaft 12 to smoothly rotate within the arm 14 in response to rotation of handle 11. Helicopter collective control rod 37 is attached to collective control mount 18 via a pivot member 38 received by attachment hole 22 (not visible in FIG. 2). The attachment hole and pivot member share a common center line 4—4 with a pivot axis of universal joint 26 whereby movement of arm 14 in the plane orthogonal to the plane defined by directional lines 36 does not translate into movement of collective control rod 37. Collective control rod 37 is further joined to the helicopter's collective control system (not illustrated).

The universal joint 26 allows arm 14 to freely move (illustrated in phantom) in the plane defined by lines 36 via pivoting in the universal joint. Movement along this plane is translated into movement of mount 18 which further translates to movement of collective control rod 37 for communicating said movement to the helicopter's collective control system and controlling operation thereof. The control base member 28 is suitably mounted to the helicopter frame 40, providing a stable attachment for base 28 while allowing movement of arm 14 relative to the base.

The base throttle shaft 32 is supported within base member 28 via bearing sets 19 and 21, located at each end of base member 28. The constant velocity joint 30 connects throttle control shaft 12 with base throttle shaft 32 and translates rotation of throttle shaft 12 into rotation of throttle shaft 32 without binding.

Referring now to FIG. 3, a side view of the control according to the present invention taken on line 3—3 from beneath in FIG. 1 and orthogonal to the line 2—2, the universal joint 26 also allows the control 14 to move freely in the direction of arrows 42 relative to base 28. Movement of arm 14 in the direction of arrows 42 causes movement of mount arm 20, which translates into lateral movement of rudder control rod 43 pivotally mounted to base arm 20 via pivot member 44 for controlling operation of the helicopter rudder or anti-torque. Pivot member 44 affixes helicopter rudder control rod 43 to mount 20 via mount hole 24 (not visible in FIG. 3). The pivot member 44 (and mount hole) share a common center line 5—5 with a pivot axis of universal joint 26, thereby ensuring that movement of arm 14 in the plane defined by lines of FIG. 2 does not translate into movement of rudder control rod 43. The distal end of the rudder control rod joins to the helicopter rudder control system. Movement of the control arm is illustrated in phantom.

In the illustrated embodiment of the multi-axial hand-operated aircraft control, constant velocity joint 30 includes a shaft 39 which joins remaining coupling halves of universal joints 33 and 35. The shaft is preferably chosen to be as short as possible (or removed completely by directly joining the two universal joints 33 and 35).

In operation of a helicopter utilizing the present invention, the control is suitably placed within the helicopter so as to be operated by the pilot's left hand. The helicopter engine throttle is manipulated by rotation of throttle handle 11 and is governed so as to be held at a given level until throttle control 11 is rotated to another position. Also, sufficient friction exists to maintain control arm 14 in position until the arm is moved by the pilot. Flying a helicopter according to the method employing the apparatus of the present invention would entail takeoff as follows: The pilot gradually increases throttle by rotating throttle control 11 until takeoff engine revolution is attained. The pilot then translates control arm 14 along lines so as to increase the collective pitch while at the same time rotating throttle handle 11 to maintain the engine speed. The pilot also adjusts the helicopter cyclic control (via manipulation of the cyclic stick (not shown) with the pilot's right hand) so as to cause the helicopter to lift off. At the same time, the pilot translates the control arm 14 along the lines 42 to adjust rudder or anti-torque, compensating for the engine torque and controlling the direction to which the fuselage points also commonly referred to as yan. Flight adjustments may then be accomplished through varying the standard cyclic stick with the pilot's right hand and the multi-axial hand-operated helicopter control with the operator's left hand.

In a preferred embodiment, the control 10 is mounted horizontally with respect to the helicopter fuselage such that vertical movements of the control arm translate to collective pitch control (raising arm 14 causes the helicopter to climb, lowering the arm causes the helicopter to descend) and horizontal movements of the control arm translate into rudder control, wherein moving the control arm to the left causes the nose of the helicopter to turn left and moving the control to the right causes the helicopter to turn right. The control may be constructed of any suitable material, for example, aluminum.

The use of the helicopter control in accordance with the present invention is advantageous in that the pilot is not required to use foot pedals in order to fly the helicopter. Eye-to-hand coordination is more intuitive than eye-to-foot coordination, leading to simpler operation of the helicopter. Further, the pilot's feet are free to operate other controls. Another advantage of the present invention is enabling helicopter flight by pilots who do not have use of their feet and legs.

A universal joint with a constant velocity joint passing therethrough in accordance with the present invention is advantageous in that high torque rotation may be accomplished. Such high torque flexible rotation is also advantageous in other applications. As an alternative, the constant velocity joint employed in the center of the universal joint may be replaced, for example, by a flexible speedometer type cable. However, such an arrangement would not support high torque applications.

Figure 4:
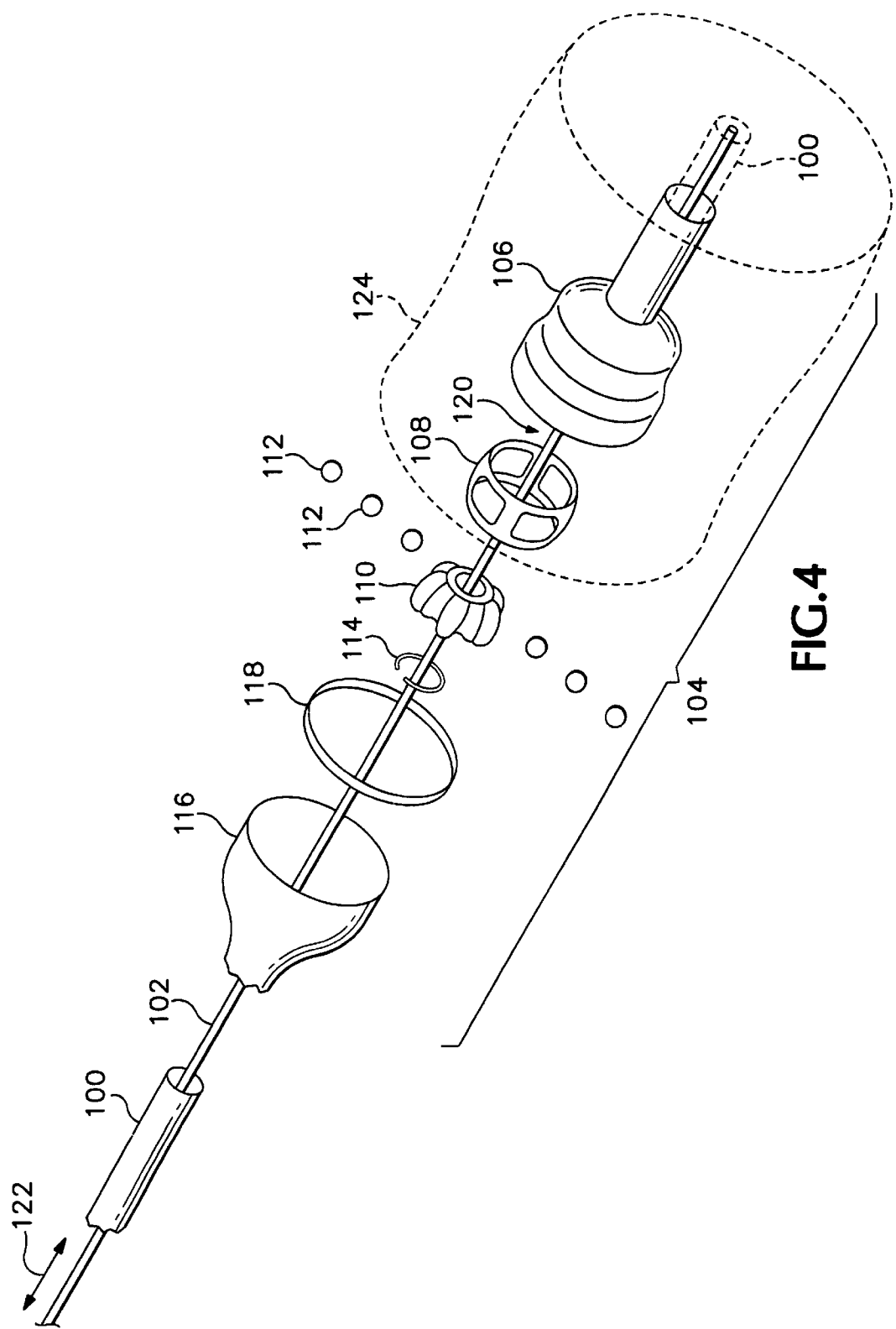
FIG. 4 is an illustration of an embodiment for imparting rotary motion through a flexing joint employing plural constant velocity joints.

In an alternative embodiment, rotary motion may be imparted through a flexing joint by use of plural constant velocity joints, wherein successively smaller size constant velocity (CV) joints are positioned within the next larger CV joint, as illustrated in FIG. 4. This particular embodiment can be useful, for example, in industrial control or robotics in hostile environments (e.g. high radiation or heat) where hydraulic or electrical controls would be impractical. Multiple control information is accordingly imparted through each of the constant velocity joints, wherein each successive joint is rotatable independently of any other successive joint. The various shafts of the outer CV joints are hollow, to receive and accommodate the successive inner shafts. The innermost shaft may be hollow or not, and can comprise, for example, a speedometer type cable, to enable a push-pull type action along line 122. In the particular example of FIG. 4, an outer CV joint is shown in exploded form. The apparatus comprises a hollow outer shaft 100 which has inner shaft 102 therewithin. Outer CV joint 104 comprises, for example, outer race 106, cage 108, inner race 110 and associated balls 112 held in place via snap ring 114. A seal 116 covers the CV joint when assembled, and is held in place via clamp 118. CV joint 104 allows rotary motion of outer shaft 100 to be transferred through a flex point. Interior CV joint 120, not visible, is positioned centrally within joint 104, and provides flexing for inner shaft 102, while transferring rotary motion of shaft 102. Shaft 100 and shaft 102 are rotatable independently of each other.

While the illustration of FIG. 4 shows two shafts, it will be understood by those skilled in the art that successively larger outer shafts may be employed with respective CV joints (one such shaft and CV joint 124 combination is shown in phantom in FIG. 4), to enable plural shafts to be rotated independently of one another, while still enabling rotary motion through a flex position. It will also be understood that the particular type of CV joint of FIG. 4 is shown by way of illustration only and that other CV joint configurations may be substituted. For example, as discussed in conjunction with FIG. 1, a CV joint comprised of two universal joints may be used for one or more of the CV joints, wherein the universal joints are hollow at the center so as to enable placement of the successive interior CV joints therewithin. The various inner shafts may be kept in spaced relation to each other via bearings, bushings or other suitable means.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An apparatus for transmitting rotary motion through a flex point comprising:
   a joint defining the flex point, said joint having an aperture at the center thereof;
   a rotatable flexible drive member placed within said aperture at the center of said joint; and
   first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, wherein said rotatable flexible drive member comprises a constant velocity joint.

2. An apparatus for transmitting rotary motion through a flex point comprising:
   a joint defining the flex point, said joint having an aperture at the center thereof;
   a rotatable flexible drive member placed within said aperture at the center of said joint; and
   first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, wherein said rotatable flexible drive member comprises a flexible rotatable cable.

3. An apparatus for transmitting rotary motion through a flex point comprising:
   a joint defining the flex point, said joint having an aperture at the center thereof;
   a rotatable flexible drive member placed within said aperture at the center of said joint; and
   first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, wherein said joint comprises a constant velocity joint.

4. An apparatus for transmitting rotary motion through a flex point comprising:
   a joint defining the flex point, said joint having an aperture at the center thereof;
   a rotatable flexible drive member placed within said aperture at the center of said joint; and
   first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, wherein said joint comprises plural constant velocity joints.

5. An apparatus for transmitting rotary motion through a flex point comprising:
   a joint defining the flex point, said joint having an aperture at the center thereof;
   a rotatable flexible drive member placed within said aperture at the center of said joint; and
   first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, wherein said rotatable flexible drive member comprises a constant velocity joint and said joint defining the flex point comprises a universal joint.

6. An apparatus for transmitting rotary motion through a flex point comprising:

a joint defining the flex point, said joint having an aperture at the center thereof;

a rotatable flexible drive member placed within said aperture at the center of said joint; and first and second rotary drive members wherein said rotatable flexible drive member is connected to said first and second rotary drive members, for transmitting rotary motion of said first rotary drive member to said second rotary drive member while allowing flexing of said first and second rotary drive members relative to one another about the flex point, further comprising a flexible push-pull member passing through the flex point for imparting longitudinal motion through the flex point.

7. The apparatus according to claim 6 wherein said push-pull member comprises a flexible shaft.

* * * * *